United States Patent [19]

Kotyk

[11] Patent Number: 4,944,534
[45] Date of Patent: Jul. 31, 1990

[54] FRANGIBLE MALE COUPLING COMPONENT

[75] Inventor: Jeffrey M. Kotyk, St. Louis, Mo.

[73] Assignee: McNeil (Ohio) Corporation, St. Paul, Minn.

[21] Appl. No.: 252,770

[22] Filed: Oct. 3, 1988

[51] Int. Cl.$^5$ ............................................. F16L 19/00
[52] U.S. Cl. ........................................ 285/4; 285/341; 285/382.7
[58] Field of Search .............. 285/3, 4, 353, 356, 285/382.7, 382, 341

[56] References Cited

U.S. PATENT DOCUMENTS

| | | |
|---|---|---|
| 892,972 | 7/1908 | Bryce . |
| 1,062,039 | 5/1913 | Schimmel . |
| 1,561,679 | 11/1925 | Woodring et al. . |
| 1,755,210 | 4/1930 | Dohner .................... 285/4 |
| 1,889,778 | 12/1932 | Dobrick ................... 285/4 |
| 1,927,464 | 9/1933 | McIntosh ................. 285/4 |
| 2,064,377 | 12/1936 | Gordon .................. 267/50 |
| 2,470,508 | 5/1949 | Maky ..................... 285/86 |
| 2,497,273 | 2/1950 | Richardson ............. 285/86 |
| 2,544,109 | 3/1951 | Richardson ............... 285/3 |
| 2,935,339 | 5/1960 | Frederick ................. 285/4 |
| 3,004,776 | 10/1961 | Sebardt ................... 285/3 |
| 3,139,293 | 6/1964 | Franck .................... 285/4 |
| 3,290,062 | 12/1966 | Ziherl et al. ............. 285/3 |
| 3,399,589 | 9/1968 | Breed ....................... 85/1 |
| 3,743,324 | 7/1973 | Schwarz et al. .......... 285/3 |
| 3,866,950 | 2/1975 | Skoch et al. ............. 285/4 |
| 3,923,323 | 12/1975 | Brogan ............... 285/382.7 |
| 4,022,497 | 5/1977 | Kotsakis ................. 285/4 |
| 4,116,472 | 9/1978 | Schmitt .................. 285/4 |
| 4,240,462 | 12/1980 | Bankstahl ............... 285/4 |
| 4,304,422 | 12/1981 | Schwarz ................. 285/4 |
| 4,585,210 | 4/1986 | Adams .................. 251/214 |
| 4,586,731 | 5/1986 | Castrup .................. 285/4 |

FOREIGN PATENT DOCUMENTS 646787  11/1950  United Kingdom ............ 285/3

Primary Examiner—Randolph A. Reese
Assistant Examiner—Anthony Knight
Attorney, Agent, or Firm—Senniger, Powers, Leavitt and Roedel

[57] ABSTRACT

A frangible male coupling component for sealingly coupling a conduit to a fluid delivery device of the type having a female coupling component with a threaded axial passage therethrough and an internal camming surface in the passage. The male coupling component has an integral tubular body of one-piece construction sized to coaxially receive the conduit to be coupled. The tubular body has an axial inner ferrule portion engageable with the camming surface, an axial outer screw portion, and an annular frangible portion integrally connecting the ferrule and screw portions. The frangible portion is designed to break on rotation of the screw portion when the ferrule portion is in engagement with the camming surface, with continued rotation of the screw portion in the first direction effecting relative axial movement of the screw portion relative to the ferrule portion to a point where the screw portion presses the ferrule portion against the internal camming surface, thereby causing the ferrule portion to deform radially inwardly to form a seal around the conduit. The frangible portion is configured to break into separate parts attached to the screw and ferrule portions, the parts being engageable with one another to inhibit separation of the screw and ferrule portions in the event the male coupling component is removed from the female coupling component.

8 Claims, 1 Drawing Sheet

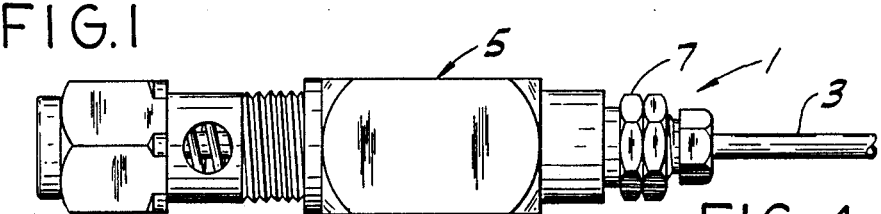
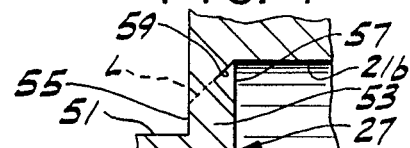
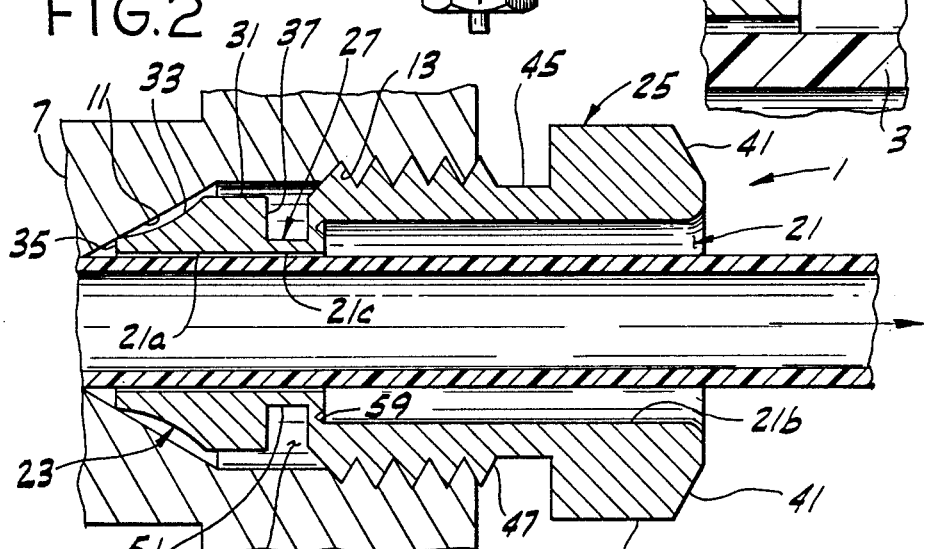
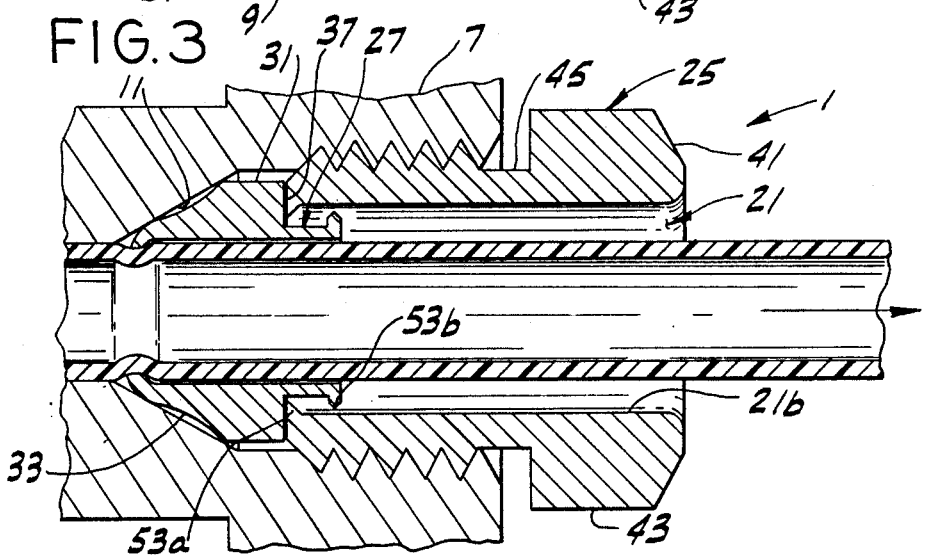

FRANGIBLE MALE COUPLING COMPONENT

BACKGROUND OF THE INVENTION

This invention relates generally to couplings used in fluid connections, and more particularly to a one-piece frangible male coupling component used to couple a fluid-flow conduit to a female coupling component.

The present invention has particular (albeit not exclusive) application to injectors for delivering periodic quantitites of lubricant to parts (e.g., bearings) in need of lubrication. Secifically, this invention represents an improvement on a coupling used to couple a tube to the outlet of an injector. The prior coupling includes a male coupling component comprising two separate parts, i.e., a ferrule part and a compression screw part having bores for receiving a tube therethrough, the screw part being threadable into an internally threaded passage in a female coupling component to press the ferrule part against a conical camming surface in the passage thereby to deform the ferrule inwardly to seal against the tube and thus provide a fluid-tight connection for flow of fluid through the tube.

While the performance of the prior coupling has been generally satisfactory, the fact that the male coupling component is of two-part construction has increased manufacturing costs and caused some inconvenience in their handling and use.

Reference may be made to U.S. Pat. Nos. 1,755,210, 1,889,778, 1,927,464, 3,290,062 and 3,743,324 for couplings generally in the field of this invention.

SUMMARY OF THE INVENTION

Among the several objects of this invention may be noted the provision of an improved male coupling component for use in coupling a conduit (e.g., a tube) to the female coupling component of a fluid delivery device such as an injector; the provision of such a coupling component which is of one-piece die-cast construction for economical manufacture; the provision of such a component which is frangible and adapted to break during installation of the coupling for making a fluid-tight connection; and the provision of such a frangible coupling component which is adapted to break into parts which are relatively rotatable but relatively inseparable for ready disconnection and reconnection of the coupling components.

Generally, a frangible male coupling component of the present invention is adapted for sealingly coupling a conduit to a fluid delivery device, such as a lubricant injector, of the type having a female coupling component with an axial passage therethrough, an internal camming surface in the passage, and internal threads spaced axially outwardly from said camming surface. The male coupling component has an integral tubular body of one-piece construction adapted to coaxially receive the conduit to be coupled. The tubular body includes an axial inner ferrule portion having a bore therethrough, said ferrule portion being engageable with the camming surface in the passage in the female coupling component, and an axial outer screw portion having a bore therethrough generally coaxial with the bore through the ferrule portion. The screw portion has a head formed for engagement by a wrench or the like and a shank extending axially inwardly from the head formed with external threads engageable with the internal threads of the female coupling component whereby rotation of the screw portion in a first direction is adapted to effect relative axial movement of the male coupling component and the female coupling component to bring the ferrule portion into engagement with said camming surface. The ferrule and screw portions are integrally connected by a frangible portion having a bore therethrough generally coaxial with the bores through said screw and ferrule portions, the frangible portion being adapted to break on rotation of the screw portion in said first direction when the ferrule portion is in engagement with the camming surface thereby to permit relative rotation between the screw and ferrule portions, continued rotation of the screw portion in said first direction being adapted to effect relative axial movement of the screw portion relative to the ferrule portion to a point where the screw portion is engageable with the ferrule portion to press the ferrule portion against the internal camming surface thereby to cause the ferrule portion to deform radially inwardly against the conduit to form a seal around the conduit to prevent leakage therepast. The frangible portion is configured to break into separate parts attached to the screw and ferrule portions, the parts being engageable with one another to inhibit separation of the screw and ferrule portions in the event the screw portion is rotated in a second direction opposite from said first direction to remove the male coupling component from the female coupling component.

Other objects and features will be in part apparent and in part pointed out hereinafter.

BRIEF DESCRIPTION OF THE DRAWINGS

FIG. 1 is a side elevation of a tube coupled to fluid delivery device (i.e., an injector) using a frangible male coupling component of the present invention;

FIG. 2 is a side elevational view in cross section showing the male coupling component, including its ferrule and screw portions connected by a frangible portion;

FIG. 3 is a view similar to FIG. 2 showing the male coupling component with its frangible portion broken and its ferrule portion in sealing engagement with the conduit being coupled; and FIG. 4 is an enlarged view of the frangible portion of the male coupling component.

Corresponding reference numerals designate corresponding parts throughout the several views of the drawings.

DESCRIPTION OF THE PREFERRED EMBODIMENT

Referring now to the drawings, a male coupling component of the present invention is indicated in its entirety by the reference numeral 1. The purpose of the component is to couple a conduit in the form of a tube 3 to a fluid delivery device, such as the injector generally designated 5, so that fluid may be delivered from the injector through the tube 3 to points in need of lubricant, for example. As best illustrated in FIGS. 1 and 2, the injector 5 has a female coupling component 7 having a passage 9 therethrough for exit of fluid from the injector into the tube 3, and an internal conical camming surface 11 in the passage. The passage is internally threaded as indicated at 13 axially outwardly (downstream as viewed in the drawings) from the camming surface 11. It will be understood that the male coupling component could similarly be used to couple a conduit and a fluid delivery device for flow of fluid to (rather than from) the device via the conduit.

The male coupling component 1 has an integral tubular body of one-piece construction (e.g., die-cast construction) having an axial bore therethrough indicated generally at 21 for coaxially receiving the conduit 3 to be coupled. The component may be made from any suitable material having the necessary fabrication and frangibilty characteristics, such as die-cast zinc. The tubular body has three sections, including an axial inner ferrule portion, generally designated 23, having a bore 21a therethrough constituting a portion of bore 21, an axial outer screw portion, generally designated 25, having a bore 21b therethrough constituting a portion of bore 21, and an annular frangible portion, generally designated 27, integrally connecting the ferrule and screw portions 23, 25 and having a bore 21c therethrough constituting a portion of bore 21. The bores 21a, 21c through the ferrule and frangible portions are of the same diameter, which is slightly greater than the outer diameter of conduit 3 but substantially less than the diameter of the bore 21b through the screw portion 25.

As illustrated in FIG. 2, the ferrule portion 23 of the component 1 has a generally cylindric body section indicated at 31 and a nose section 33 which tapers radially inwardly in the axially inward direction (to the left as viewed in the drawings). The nose section 33 terminates in a relatively narrow annular end face 35 lying in a radial plane at the axial inner end of the ferrule portion. The ferrule portion 23 has a relatively wide radially extending annular surface 37 at its opposite (axial outer) end.

The screw portion 25 has an enlarged head 41 formed with flats 43 for engagement by a wrench or the like to enable the component 1 to be rotated on its axis, and a cylindric shank 45 of smaller diameter extending axially inwardly (to the left as viewed in the drawings) from the head 41. The shank is formed with external threads 47 engageable with the internal threads 13 of the female coupling component 7 of the fluid delivery device 5 whereby rotation of the screw portion 25 in a first direction is adapted to effect relative axial movement of the male coupling component 1 and the female coupling component 7 to bring the leading (axial inner) end of the nose 33 of the ferrule portion 23 into engagement with the camming surface 11 in passage 9.

The frangible portion 27 integrally connecting the ferrule and screw portions 23, 25 is generally annular in shape, comprising a sleeve 51 coaxial with bore 21 integrally joined at its axial inner end to the ferrule portion 23, and a radial annular flange 53 integrally connecting the other end of the sleeve and the screw portion 25 of the component 1. The flange 53 has an axial inner (left as viewed in FIG. 2) annular face 55 spaced axially outward from surface 37 of the ferrule portion 23, and an axial outer (right) annular face 57 defining part of bore 21b. A circular V-shaped groove 59 is provided in the latter face 57 to form an area of weakness, the arrangement being such that the flange 53 is adapted to break at the groove 59 when the male and female components 1, 7 of the coupling are assembled, as will appear. As illustrated best in FIGS. 3 and 4, the flange 53 is preferably designed to break into separate flange parts 53a, 53b generally along a line L extending axially and radially inwardly from the apex of the V-shaped groove. The resultant flange parts, one of which (53a) is attached to the screw portion 25 and the other (53b) to the ferrule portion 23, are engageable with one another to inhibit separation of the screw and ferrule portions in the event the male coupling component 1 is removed from the female coupling component 7. Other configurations providing the necessary frangibilty may also be suitable so long as separation of the screw and ferrule portions is inhibited.

To make the coupling shown in the drawings, the male component 1 is threaded into the female component 7 by rotating the screw portion 25 in a first direction to until the nose 33 of the ferrule portion 23 moves into engagement with the internal camming surface 11 in the female component. Continued rotation of the male component will then cause the frangible portion 27 of the male component to fracture along line L at groove 59 thereby permitting relative rotation between the screw and ferrule portions. Further rotation of the screw portion 25 in the same (first) direction effects relative axial telescoping movement of the screw portion over the ferrule portion 23 to a point where the shank 45 of the screw portion engages end surface 37 of the ferrule portion and presses the nose 33 of the ferrule portion against the internal camming surface 11. This causes the nose of the ferrule portion to deform radially inwardly to a position in which the inner end face 35 of the nose presses against the conduit 3 to form a seal around the conduit to prevent leakage therepast, a fluid-tight coupling thus being completed.

To remove the male coupling 1 and conduit 3 from the female coupling 7, the screw portion 25 of the coupling is rotated in a second direction opposite from the stated first direction, which causes the screw portion to back out of the female coupling. As the screw portion backs out, the broken parts 53a, 53b of the frangible flange 53 are adapted to engage one another to inhibit total separation of the screw and ferrule portions, the result being that the entire male component 1 may readily be removed as a unit from the female component of the coupling. The fact that complete separation of the screw and ferrule portions 25, 23 is inhibited by the interference between the broken flange parts 53a, 53b also facilitates subsequent handling and reuse of the male coupling.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A frangible male coupling component for sealingly coupling a conduit to a fluid delivery device, such as a lubricant injector, of the type having a female coupling component with an axial passage therethrough, an internal camming surface in the passage, and internal threads spaced axially outwardly from said camming surface, said male coupling component having an integral tubular body of one-piece construction adapted to coaxially receive the conduit to be coupled, said body comprising:

an axial inner ferrule portion engageable with said camming surface, said ferrule portion having a bore therethrough;

an axial outer screw portion having a bore therethrough generally coaxial with the bore through said ferrule portion, a head formed for engagement by a wrench or the like, and a shank extending axially inwardly from the head formed with external threads engageable with the internal threads of the female coupling component whereby rotation of the screw portion in a first direction is adapted to effect relative axial movement of the male coupling component and the female coupling component to bring said ferrule portion into engagement with said camming surface; and an annular frangible portion integrally connecting said ferrule and screw portions, said frangible portion having a bore therethrough generally coaxial with the bores through said ferrule and screw portions, said frangible portion being adapted to break on rotation of the screw portion in said first direction when the ferrule portion is in engagement with said camming surface thereby to permit relative rotation between said screw and ferrule portions, continued rotation of the screw portion in said first direction being adapted to effect relative axial movement of the screw portion relative to the ferrule portion to a point where said screw portion is engageable with the ferrule portion to press the ferrule portion against said internal camming surface therebY to cause said ferrule portion to deform radially inwardly against the conduit to form a seal around the conduit to prevent leakage therepast;

said frangible portion being so configured as to break into separate parts attached to the screw and ferrule portions, said parts being engageable with one another to inhibit separation of the screw and ferrule portions in the event the screw portion is rotated in a second direction opposite from said first direction to remove the male coupling component from the female coupling component.

2. A male coupling component as set forth in claim 1 wherein said frangible portion comprises a sleeve formed integrally with said ferrule portion, and a generally radially extending annular flange integrally joining said sleeve and the shank of the screw portion, said flange being configured to break into a radial inner part and a radial outer part.

3. A male coupling component as set forth in claim 2 wherein said flange is adapted to break along a line angling radially inwardly in the axially inward direction.

4. A male coupling component as set forth in claim 2 wherein the bore through said sleeve has a diameter substantially the same as the diameter of the bore through said ferrule portion, and the bore through said screw portion has a diameter substantially greater than the diameter of the bore through the sleeve and ferrule portions.

5. A male coupling component as set forth in claim 4 wherein said flange has an axial inner face toward said ferrule portion, an axial outer face toward said screw portion, and a generally circular groove in said axial outer face, said groove being generally V-shaped in cross section.

6. A male coupling component as set forth in claim 5 wherein said ferrule portion has a generally radially extending annular surface forming its axial outer end, said shank of the screw portion being engageable with said annular surface to press the ferrule portion against said camming surface.

7. A male coupling component as set forth in claim 6 wherein said flange is adapted to break along a line angling radially inwardly in the axially inward direction.

8. A male coupling component as set forth in claim 1 wherein said ferrule portion has a radial outer surface which tapers radially inwardly in the axially inward direction.

* * * * *